(12) United States Patent
Freiberg et al.

(10) Patent No.: US 12,398,695 B2
(45) Date of Patent: Aug. 26, 2025

(54) METHOD OF OPERATING A WIND TURBINE

(71) Applicant: Siemens Gamesa Renewable Energy A/S, Brande (DK)

(72) Inventors: Uffe Sjølund Freiberg, Vejle Øst (DK); Bert Gollnick, Hamburg (DE); Xavier Vives Jaume, Brande (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/874,103

(22) PCT Filed: Aug. 28, 2023

(86) PCT No.: PCT/EP2023/073489
§ 371 (c)(1),
(2) Date: Dec. 12, 2024

(87) PCT Pub. No.: WO2024/046949
PCT Pub. Date: Mar. 7, 2024

(65) Prior Publication Data
US 2025/0163888 A1    May 22, 2025

(30) Foreign Application Priority Data
Aug. 29, 2022 (EP) .................... 22192625

(51) Int. Cl.
*F03D 7/04* (2006.01)
*F03D 7/02* (2006.01)

(52) U.S. Cl.
CPC ........... *F03D 7/043* (2013.01); *F03D 7/0292* (2013.01); *F03D 7/045* (2013.01)

(58) Field of Classification Search
None
See application file for complete search history.

(56) References Cited

U.S. PATENT DOCUMENTS 9,035,479 B1    5/2015  Gates
2023/0332573 A1*  10/2023  Gollnick ................ F03D 80/50

FOREIGN PATENT DOCUMENTS

| EP | 3964707 A1 | 3/2022 |
| WO | 2014187461 A1 | 11/2014 |
| WO | 2021214152 A1 | 10/2021 |

OTHER PUBLICATIONS

PCT International Search Report and Written Opinion of International Searching Authority mailed Dec. 5, 2023 corresponding to PCT International Application No. PCT/EP2023/073489 filed Aug. 29, 2023.

* cited by examiner

*Primary Examiner* — Juan G Flores

(57) ABSTRACT

A method of operating a wind turbine is provided. The wind turbine is operable in plural different operating modes that differ by at least one of lifetime consumption of the wind turbine and energy production by the wind turbine. A sequence of operating modes is determined for a future period of time, wherein an optimization parameter is estimated based on at least one estimated external parameter. The method further includes obtaining a current value for the at least one external parameter and determining an actual operating mode for the wind turbine for a current point in time, wherein the determining of the actual operating mode comprises estimating an adjusted optimization parameter for plural sequences and for the current value of the at least one external parameter, and selecting the actual operating mode based on the estimated adjusted optimization parameters. The wind turbine is operated in the determined actual operating mode.

15 Claims, 8 Drawing Sheets

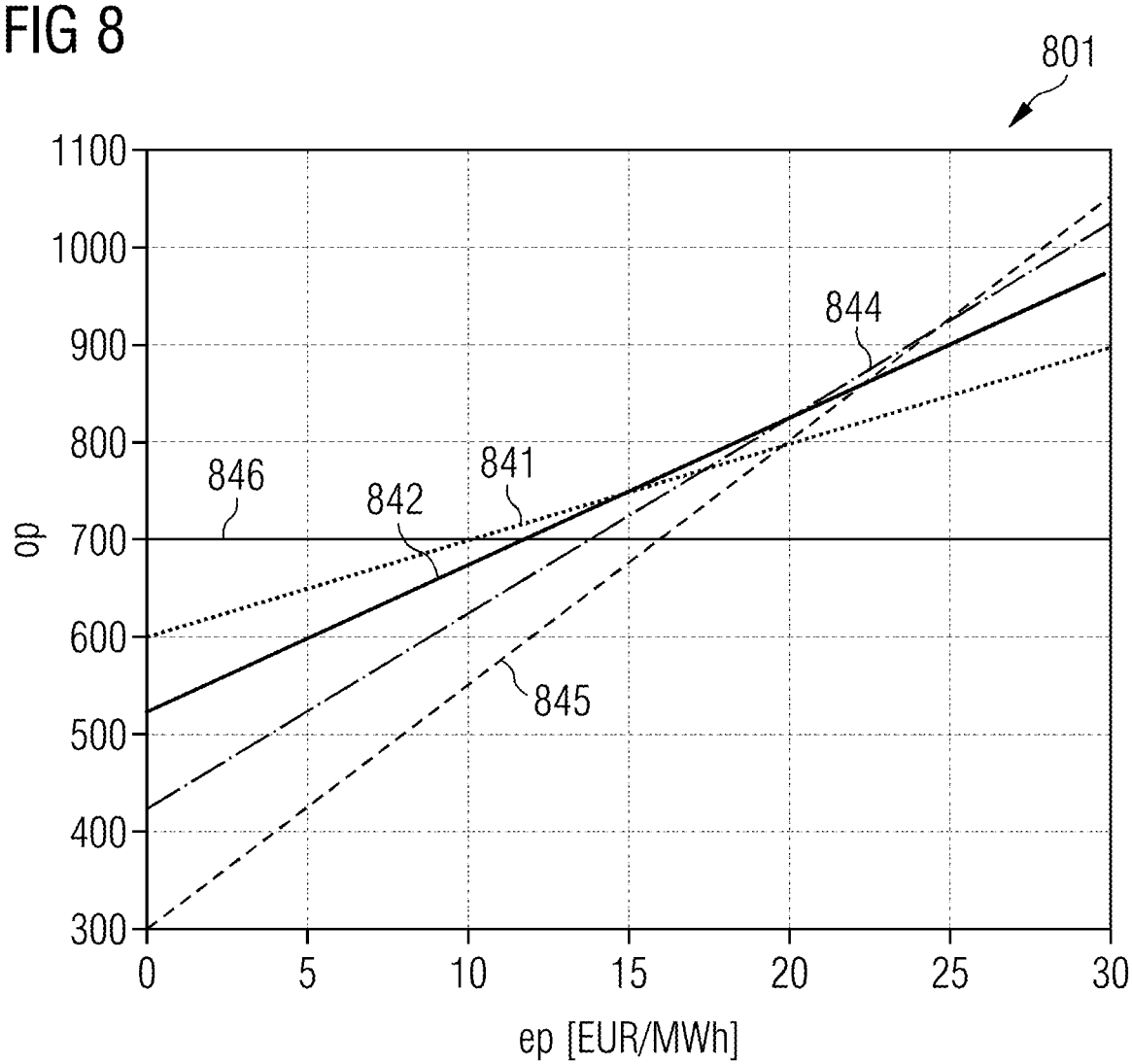

METHOD OF OPERATING A WIND TURBINE

FIELD OF THE INVENTION

The present invention relates to a method of operating a wind turbine, wherein the wind turbine is operable in plural different operating modes. The invention also relates to a control system and a wind turbine comprising such control system, and further to a computer program.

BACKGROUND

The use of wind energy is proliferating. Wind turbines are being installed at different locations throughout the world and are thus exposed to different environmental conditions. Wind turbines must withstand considerable wind forces that act on the rotor, the nacelle and the tower of the wind turbine. During their lifetime, the structural components of the wind turbine are exposed to a number of load cycles that can eventually lead to failure of a component. Wind turbines can often be operated in different operating modes, wherein some modes drive the wind turbine more aggressively (generally resulting in higher loads and higher energy production), while other modes drive the wind turbine less aggressively (generally resulting in lower loads and lower energy production).

The wind turbine may further be exposed to varying environmental conditions, such as wind speeds, which may in some situations result in a reduced energy production, and may in other situations result in high loads acting on the wind turbine and thus in a high lifetime consumption. It is therefore difficult for an operator to determine the best way in which the wind turbine is to be operated. Some optimization methods are known which optimize the wind turbine operation to achieve an optimization target, such as a maximization of the energy production, a minimization of lifetime consumption, a maximization of the alignment between energy production and demand, and a maximization of revenue. An example of such optimization is described in the document WO 2021/214152 A1. Although this method achieves a good optimization for many situations, there might be some situations in which the determined operating scheme for the wind turbine can still be improved to achieve a better result, e.g. a higher energy production or return, a longer lifetime, or making better use of the wind turbine over a design lifetime.

SUMMARY

There is accordingly a need to improve the operation of a wind turbine, and in particular to operate the wind turbine in such way that an operation target is better achieved, such as improved energy production or revenue.

This need is met by the features of the independent claims. The dependent claims describe embodiments of the invention.

In an embodiment of the present invention, a method of operating a wind turbine is provided, wherein the wind turbine is operable in plural different operating modes that differ by at least one of lifetime consumption of the wind turbine and energy production by the wind turbine. The method comprises determining, in an optimization procedure, a sequence (one or more) of the operating modes for a future period of time. Determining the sequence comprises estimating, for the future period of time and for each of plural different sequences that include different combinations of operating modes (e.g. candidate sequences), an optimization parameter based at least on an estimated energy production associated with the operation of the wind turbine in the operating modes of the respective sequence. Such optimization procedure may also be termed long-term optimization, as it may estimate the optimization parameter for a longer period of time, e.g. until an estimated end of life of the wind turbine.

The method may further comprise obtaining a current value of at least one parameter, wherein the at least one parameter is an operating parameter of the wind turbine and/or an external parameter, and determining an actual operating mode for the wind turbine for a current point in time, wherein the determining of the actual operating mode is based at least on the determined sequence of operating modes and the obtained current value of the at least one parameter. Such selection of the actual operating mode may be termed short-term optimization, as it may determine the actual operating mode for a shorter period of time. Further, the wind turbine is operated in the determined actual operating mode.

The actual operating mode may be allowed to differ from the operating mode prescribed by the determined sequence of operating modes for the current point in time, in particular to differ from a determined sequence for which the estimated optimization parameter meets an optimization target (optimal sequence).

Several benefits may be achieved by such method. The determined sequence of operating modes may be or may include a sequence for which the optimization parameter is at its optimum, e.g. at a maximum or minimum, depending on the kind of optimization parameter. An example is a sequence of operating modes that maximizes energy production or revenue. However, as such determined sequence may be based on one or more estimated operating parameters and/or estimated external parameters, such sequence may in actual operation not always provide the best results. In particular, the actual current value of the parameter might be quite different from the actual estimation, so that changing operation to a mode different from the mode prescribed by the 'optimal sequence' may in fact improve the performance and may better achieve the optimization target. Further, by determining the actual operating mode not only based on the current value of the parameter, but by also considering the determined (optimal) sequence, an impact of the change of mode on the optimal sequence can be taken into account. This may allow the selection of the actual operating mode such that the optimization target of the overall sequence is better achieved. As an example, an aggressive operation may currently be selected, but then an update to the current external parameter (e.g. electricity price) is received, which is lower than the estimated external parameter, which would result in an optimum operation if a curtailed operation mode of the turbine is used, thereby saving the lifetime for later use. As another example, if a curtailed operation mode is currently selected due to a low value of the estimated external parameter, but the current value is significantly higher than the estimated value, then changing to an aggressive operation mode of the turbine may result in a generation of more power and revenue now at the cost of the lifetime of the turbine. By determining the actual operating mode of the wind turbine from both the current value of the parameter and the (one or more) determined (optimal) sequence of operating modes, several benefits may thus be achieved. Further, the initial optimization procedure, i.e. the long-term optimization, is not repeated for determining the actual operating mode in the short-term optimization, as explained in more detail further below. The control may thus be made more efficient, as the actual operating mode can be determined repeatedly (e.g., within a short time period) without repeating the optimization procedure, i.e. without performing a long-term optimization until an estimated end of life.

The determining of a sequence of operating modes may comprise determining one or more optimal sequences for which the optimization parameter meets an optimization target. The determined sequence of operating modes may be a sequence of modes in which the wind turbine is to be operated during the future period of time. For example, such optimal sequence may be used as a prescribed sequence for operating the wind turbine in the future period of time, or one or more of such optimal sequences may be used for deriving the actual operating mode.

Optionally, the estimation of the optimization parameter may be further based on an estimation (e.g. estimated value) of the operating parameter and/or of the external parameter for the future period of time. The respective parameter may be estimated for time intervals of the future period of time. The estimated operating parameter may be an estimated lifetime consumption. The estimated external parameter may be estimated wind conditions and/or estimated electricity price.

For example, the estimation of the optimization parameter may be further based on an estimated lifetime consumption. An end of life of the wind turbine may thus be predicted, which may allow a more precise estimation of the optimization parameter.

The future (first) period of time may comprise a sequence of time intervals, wherein the sequence of operating modes may be defined by an operating mode for each time interval. The length of the time interval may for example be at least a month (e.g., at least 28 days), it may for example be 1, 2, 3, 4 or more month, a quarter of a year, half a year or a full year. The future (first) period of time may start at a current point in time.

The future (first) period of time may extend to an end of life of the wind turbine. The end of life may be a predefined end of life (design end of life, e.g., 20 years or 25 years), and/or may be the point in time at which the lifetime of the wind turbine has been consumed (e.g., as estimated from the respective sequence of operating modes). Combinations are also conceivable (e.g. the end of the future period of time may correspond to the design lifetime, but may end earlier if the lifetime of the wind turbine is consumed prior to reaching the design lifetime).

The sequence of operating modes may be determined for a future first period of time, wherein the actual operating mode for the wind turbine may be determined for a future second period of time that is shorter than the first period of time and that at least partially overlaps with the first period of time. The first and/or second period of time may include the current point in time. The length of the second period of time may correspond to or may be shorter than the length of a time interval of the first period. The current value of the parameter may be obtained for a current point in time and/or such second time period, in particular for a second period of time that is shorter than the time interval (it may be an actual (measured, received, or derived) value or a near future estimate).

In particular, the actual operating mode may be determined repeatedly during a time interval of the future (first) period of time (for which time interval each sequence defines only one operating mode). The current value of the obtained parameter may be updated correspondingly. The determination of the actual operating mode may for example be performed each time that an updated current value for the respective parameter is obtained. As an example, the actual operating mode may be determined periodically with a period of 30 days or less, 10 days or less, 2 days or less, 1 day or less, 12 hours or less, 6 hours or less, one hour or less, or 10 minutes or less. If the parameter is an operating parameter, in particular a consumed lifetime (e.g. accumulated lifetime consumption), the period may be between 1 hour and 30 days, e.g. between 0.5 and 15 days, e.g. about 1 day. If the parameter is an external parameter, such as electricity price, the period may be between 10 minutes and 10 days, e.g. between 1 hour and 5 days. A time interval of the future (first) period of time may be at least one month, e.g. between one month and 2 years. Accordingly, optimization of the operation may be achieved both in the long term and short term, without neglecting the impact of short term optimization on the long term performance.

In some exemplary embodiments, determining the sequence of operating modes may comprise selecting the sequence from the plural different sequences for which the optimization parameter meets an optimization target, such as maximization or minimization of the optimization parameter. Such sequence may be considered to constitute an optimum sequence (for the respective optimization parameter). As indicated above, plural such optimum sequences may be determined, e.g. for different groups of sequences.

The optimization parameter may for example be at least one of energy production, the meeting of an electrical energy demand, or revenue. Revenue may for example be estimated by making use of an external parameter in form of electricity price. Electricity price is generally dependent on electrical power demand, in particular how well the demand can be met by the available electrical power (if less electrical power is available than the demand, electricity prices will generally rise, and vice versa). Feeding electrical energy into the grid such that the demand is met may thus be achieved by feeding electrical energy into the grid when electricity prices are high. Feeding electrical energy into the grid when the demand is high (and not feeding energy into the grid when demand is low) stabilizes the power supply by the grid and stabilizes the power grid itself; frequency and/or voltage fluctuations caused by a mismatch between available power and power demand may for example be reduced. Feeding energy into the grid so as to maximize revenue may thus also reduce grid fluctuations, stabilize the grid and ensure stable power supply by the grid. Maximizing revenue may in particular correspond to maximizing the feeding of power at high power demand.

The optimization parameter may in particular correspond to a revenue. The optimization parameter may be a net present value (NPV), which may correspond to an accumulated revenue from electrical energy production by the wind turbine as determined from present point in time, e.g. until an estimated end of life of the wind turbine. The NPV may be determined by summing a revenue estimated for time intervals of the future period of time. The revenue may be a discounted revenue, which may be discounted in dependence on how far in the future the time interval is, for example to account for the risk that the revenue is not achieved (e.g., for time intervals further in the future, the revenue is less secure to predict, and the risk of wind turbine failure etc. increases). By such optimization parameter, the reliability of the optimization may be improved.

The optimization target may for example be a maximization of an optimization parameter in form of energy production, meeting of a power demand (e.g. how good the estimated power output corresponds to a power demand estimated from the external parameter), or revenue, or may be a minimization of an optimization parameter in form of consumed lifetime.

The plural different sequences may be candidate sequences. For each possible combination of operating modes for the future period of time, a candidate sequence may be provided. The optimization parameter may be estimated for each candidate sequence. Accordingly, all possible combinations of operating modes may be considered in determining one or more optimal sequences.

The future period of time may have a different length for different candidate sequences, e.g. the wind turbine lifetime for different candidate sequences may be estimated to expire at different future points in time, i.e. the ends of life of the wind turbine may differ.

The optimization parameter for a sequence of operating modes may be estimated by estimating wind conditions (in particular wind speed) for the future period of time, estimating the lifetime consumption of the wind turbine when operating in the sequence of operating modes at the estimated wind conditions, and estimating an energy production of the wind turbine for operation in the sequence of operating modes at the estimated wind conditions for the future period of time. The optimization parameter may be determined from the estimated energy production for the future period of time, and optionally under consideration of an estimation of the external parameter. Estimating the optimization parameter for a sequence may further comprise estimating an end of life of the wind turbine based on the estimated lifetime consumption of the respective sequence, which may correspond to an end of the future period of time for the respective sequence. After the end of life of the wind turbine has been reached, the wind turbine will likely not produce energy anymore, which may thus impact the total energy production achieved with the respective sequence of operating modes and thus the optimization parameter.

The determination of the optimization parameter may be made for each of plural time intervals of the future period of time. Determining the optimization parameter may for example comprise estimating the energy production of the wind turbine for each of plural time intervals of the future period of time based on the operating mode of the sequence corresponding to the respective time interval, estimating an external parameter for each of the time intervals, calculating the optimization parameter for each of the time intervals from the energy production and from the external parameter estimated for the respective time interval, and summing the optimization parameters determined for the time intervals (until the end of life is reached) to obtain the optimization parameter for the sequence.

Optionally, the optimization parameter may be discounted for a risk or uncertainty in achieving the optimization parameter for at least some of the time intervals. Preferably, the discounting is higher for time intervals that lie further away in the future. The higher uncertainty associated with achieving the estimated optimization parameter in the far future may thus be accounted for.

The external parameter may be at least one of wind speed, electric power demand, and electricity price. Electricity price may also be termed electric power price or electric energy price and may be measured in Euro per MWh, or an equivalent unit.

The plural different operating modes may include one, two or more down-rating modes and one, two or more up-rating modes. The plural different operating modes may include at least two, three, four or five of the following modes: a stop mode in which energy production by the wind turbine is stopped; a lifetime-enhanced (LE) operating mode that reduces the electric power output of the wind turbine for predetermined operating conditions (for example if turbulences above a threshold are determined at the wind turbine, wherein the turbulences may for example be determined based on measured wind speeds and a load model); a baseline mode in which the wind turbine is operated conventionally (in particular without activation of up-rating or down-rating features); a first performance enhanced (PE) mode in which the power output of the wind turbine is increased by a first amount (e.g. above the rated power, for example by increasing the power limit of the wind turbine under predetermined wind conditions); and a second performance enhanced (PE) mode in which the power output of the wind turbine is increased by a second amount larger than the first amount.

The stop mode and the LE mode may be down-rating modes in which the wind turbine is operated less aggressively (i.e. lower lifetime consumption). The first and second PE modes may be up-rating modes in which the wind turbine may be operated more aggressively (providing a higher power output at expense of lifetime). The first PE mode may for example be a PE5 mode in which the power output (at a respective part of the operating characteristic) is increased by 5%, and the second PE mode may for example be a PE10 mode in which the power output is increased by 10%. These are only exemplary values, and other increases may be used.

According to a first aspect of the present disclosure, the estimation of the optimization parameter may optionally further be based on at least one (e.g. 1, 2, 3 or more) estimated external parameter (in particular, an estimated value of the external parameter disclosed hereinabove). It should be clear that plural external parameters may be employed. Obtaining a current value of at least one parameter may comprise obtaining a current value for the at least one external parameter.

Determining of the actual operating mode may comprise estimating an adjusted optimization parameter each of plural different sequences of operating modes that define a different operating mode at the current point in time (in particular, each of said different sequences may define a different operating mode for the current point in time) and for which the optimization parameter has been estimated in the optimization procedure. The adjusted optimization parameter may be determined for the respective sequence of operating modes by adjusting the optimization parameter, which has been estimated in the optimization procedure for the respective sequence, for the current value of the at least one external parameter. Based on the estimated adjusted optimization parameters, one of the different operating modes may be selected as the actual operating mode.

By such method, it may be estimated how operation in the different operating modes at the current point in time impacts the optimization parameter under consideration of the current value of the external parameter. In particular, if the current value of the external parameter deviates significantly from the estimated value on which the sequence is based, selection of a mode different from the mode prescribed by the optimal sequence may be beneficial. Further, since an adjusted optimization parameter is determined for the current value of the external parameter and for the different modes at the current point in time, it can be estimated how changing the mode at the current point in time impacts the optimization parameter in the long run, which may allow the making of an optimal choice for the actual operating mode. It may for example not always be optimal to drive the wind turbine in the most aggressive mode if demand and/or electricity price are very high, in view of the increased lifetime consumption and associated loss of production due to an earlier end of life or the wind turbine.

Determining the adjusted optimization parameter may optionally consider the different lifetime consumption resulting from each of the different operating modes for the current point in time. The effect that the selection of a different operating mode for the current point in time has on the adjusted optimization parameter may thus more accurately be accounted for (e.g., selecting a more aggressive mode may result in a premature end of life, which may be accounted for).

The obtaining of a current value, the determining of the actual operating mode, and the operating of the wind turbine in the determined actual operating mode may be performed repeatedly using the same optimization parameters estimated for the plural different sequences of operating modes in the optimization procedure. Accordingly, as explained above, the (initial) optimization procedure must not be repeated, but the adjusted optimization parameters can simply be derived from the initially determined optimization parameters and the current value of the external parameter. The control may thus be made more efficient, and a more frequent change of the actual operating mode in dependence on the current value of the external parameter may be enabled.

Selecting one of the different operating modes as the actual operating mode based on the estimated adjusted optimization parameters may comprise selecting the operating mode for which operation at the current point in time results in an adjusted optimization parameter that meets an optimization target. The optimization target may be any of the optimization targets disclosed herein, it may for example be a maximization of the adjusted optimization parameter, i.e. the mode may be selected for the current operation for which the adjusted optimization parameter has the highest value.

Estimating the adjusted optimization parameter for different operating modes at the current point in time may comprise: for different sequences of operating modes that differ at least by their operating mode for the current point in time (e.g. for the current time interval), estimating the dependency of the optimization parameter derived for the respective sequence on the value of the at least one external parameter, and estimating the adjusted optimization parameter for each of said sequences for the obtained current value of the at least one external parameter using the dependency. A simple method may thus be provided of how the effect of the current value of the at least one external parameter on the value of the optimization parameter can be determined without the need to perform a full re-estimation of the optimization parameter over the whole future period of time when the current value changes.

The plural different sequences of operating modes may comprise plural groups, and each group may comprise plural different candidate sequences of operating modes. The sequences within the same group may comprise the same operating mode for a current time interval of the future period of time (i.e. they may define the same mode for the current time interval). The sequences of different groups may comprise a different operating mode for the current time interval (i.e. the groups may differ by the mode in which the sequence starts in the current time interval). The optimization parameter may be estimated for each of the different candidate sequences within each group. Information can thus be obtained on how operation in the different modes at the current point in time affects the optimization parameter.

Determining the sequence of operating modes for the future period of time may comprise determining an optimal sequence for each of the different groups by selecting a candidate sequence from the respective group for which the optimization parameter meets an optimization target (e.g. any of the targets mentioned herein), wherein the adjusted optimization parameter is estimated for each of the optimal sequences of the groups. Considering these optimal sequences facilitates the estimation of how changing the operating mode at the current point in time affects the optimization parameter (e.g. NPV) over the wind turbine lifetime.

For the optimal sequence of each group, the dependency of the optimization parameter on the value of the at least one external parameter may be estimated to determine the adjusted optimization parameter for the respective optimal sequence. This may allow consideration of how a change in operating mode may, in view of the current value of the at least one external parameter, change the overall result of wind turbine operation.

Estimating the adjusted optimization parameter may comprise employing a linear dependency or a non-linear dependency (e.g. polynomial) between the value of the optimization parameter and the value of the at least one external parameter. This may allow a fast and efficient calculation of the adjusted optimization parameter for each optimal sequence even if the current value of the at least one external parameter is frequently updated.

A slope or another parameter of the dependency may be determined so as to be dependent on an operating parameter estimated for the operating mode, for which the adjusted optimization parameter is estimated, at the current point in time (e.g. for the current time interval). This operating parameter may for example be an energy production estimated for the respective operating mode. Revenue or NPV may for example increase linearly with increasing electricity price, wherein the rate of the increase is higher if the energy production of the wind turbine is higher, which may be accounted for by such method.

Estimating the adjusted optimization parameter for an operating mode at the current point in time may comprise obtaining the optimization parameter estimated for the sequence (e.g. for the group optimal sequence) that includes the respective operating mode for a current time interval. The estimation may be based on the estimated at least one external parameter for the current time interval (e.g., the initial optimization may be based on the estimation, as indicated above). Further, the adjusted optimization parameter may be determined by adjusting this estimated optimization parameter using the current value of the at least one external parameter and an estimated dependency between the optimization parameter and the at least one external parameter for the current time interval (e.g. using the above linear relationship). This may for example be done for each of the group optimal sequences to obtain the adjusted optimization parameter for each of these group optimal sequences.

The method may further comprise estimating the energy production of the wind turbine within the current time interval when operating in the respective operating mode (e.g. as part of the initial optimization for first period of time), and estimating the dependency between the optimization parameter and the at least one external parameter from the energy production in the current time interval. An efficient and precise estimation of the optimization parameter adjusted for the current value of the at least one external parameter may thereby be achieved.

The determined actual operating mode may be set for the current time interval of the future period of time, or may be set for a shorter second period of time. It may be updated if a new current value becomes available.

According to a second aspect of the present disclosure, the determining of the sequence may further comprise selecting a sequence of operating modes for which the optimization parameter meets an optimization target (which may be termed selected (optimal) sequence). The optimization parameter and optimization target may have any of the configurations disclosed herein.

Further, obtaining a current value for the parameter may comprise a current value for the consumed lifetime of the wind turbine. For example, the lifetime consumed by the wind turbine during actual operation up to the current point in time (e.g. accumulated lifetime consumption) may be determined or estimated, e.g. from sensor data, statistical data and the like.

The determining of the actual operating mode may comprise selecting the actual operating mode from the plural different operating modes under consideration of a deviation between the current value of consumed lifetime and the consumed lifetime expected for operation in the selected sequence of operating modes (e.g. a target value associated with the consumed lifetime prescribed by the selected sequence), wherein the selecting is performed so as to keep the current consumed lifetime within a range of the consumed lifetime expected for the selected (optimal) sequence of operating modes.

By such method, it may be ensured that the target of the selected (optimal) sequence of operating modes is achieved. Determining the sequence of operating modes may be based on an expectation of lifetime consumption during the future period of time. When the wind turbine is operated in accordance with the selected sequence, and the actual lifetime consumption deviates, the optimization target may no longer be achieved. For example, if lifetime consumption is increased during certain periods, the end of life of the wind turbine may occur earlier, and energy production in the respective time range prior to the expected end of life may be lost. This negative effect may significantly affect the overall performance of the selected sequence, for example if for the last time range, good wind conditions and/or high electricity prices were expected (predicted). By making the selection of the actual mode dependent on the deviation between the actually consumed lifetime and an expectation of the consumed lifetime, and by allowing the actual mode to differ from the mode of the selected (optimal) sequence, it may be ensured that the wind turbine reaches its end of life envisaged by the selected (optimal) sequence, thus avoiding respective negative effects. On the other hand, if less lifetime is consumed than actually expected from the selected sequence of operating modes, selecting the mode in dependence on the deviation may allow the wind turbine operation to make better use of the available resources, e.g. by selecting an actual operating mode that consumes more lifetime and provides more energy production. Accordingly, allowing a deviation from the selected sequence of operating modes and selecting the actual mode in dependence on the deviation may provide several benefits and may in particular ensure reaching of the optimization target and making best use of the wind turbine.

Keeping the current consumed lifetime within a range of the consumed lifetime expected from the selected sequence of operating modes may include or may be performed by maintaining, reducing or minimizing the deviation, at least over plural periods of selecting the actual operating mode. It should be clear that the actual operating mode may be selected repeatedly during operation, e.g. with a period as outlined above. Not every operation in the actual operating mode may bring the actual consumed lifetime closer to the expected consumed lifetime, but some selections may lead to a larger deviation, which may then again be compensated in a next (subsequent) selection step for the actual operating mode. This may be due to the nature of the process, since it is generally not possible to stay exactly on the estimated lifetime curve of the selected (optimal) sequence. Also, operating in the mode that would bring the current value of consumed lifetime closer to the expected consumed lifetime may not be beneficial in every instant, e.g. at high wind and high energy prices. However, the selection is performed such that there is a tendency for the current consumed lifetime to stay close to the expected consumed lifetime.

The range may thus in some implementations not be a predefined range but a range around the expected consumed lifetime that is still acceptable and conforms with the tendency to keep current and expected consumed lifetime aligned. In other implementations, the range may have predefined borders that may be used in the selection process of the current operating mode.

The consumed lifetime expected from the selected sequence of operating modes may be employed in different ways for determining the deviation, it may for example correspond to a required remaining lifetime, e.g. a lifetime required to reach the end of life defined by the selected sequence (e.g. the end of the future period of time). Such required remaining lifetime may be used to estimate the target consumed lifetime for the current point in time, or an estimated end of life when starting from the actual current consumed lifetime, or the like.

In an example, the consumed lifetime expected for the selected sequence of operating modes may be determined by determining a target value for the consumed lifetime of the wind turbine for the current point in time based on the selected sequence of operating modes, wherein the deviation is a deviation between the target value of consumed lifetime and the current value of consumed lifetime for the current point in time. Accordingly, it may be determined if more or less lifetime has been consumed than expected, and the deviation can be used for making the selection of the actual operating mode.

As another example, the consumed lifetime expected for the selected sequence of operating modes may be determined by determining an estimated current end of life of the wind turbine based on the current value of consumed lifetime and an expected lifetime consumption for operation in the selected sequence of operating modes, wherein an end of the future period of time may correspond to a target end of life, wherein the deviation may be a deviation between the target end of life and the estimated current end of life. The target end of life may be estimated from the sequence of operating modes, e.g. at the time of selecting the sequence, for example when performing the initial optimization in accordance with the optimization target. The target end of life may be the end of life that is to be reached by the selected sequence.

Determining the target value for the consumed lifetime of the wind turbine (for the current point in time) may comprise calculating the accumulated lifetime consumption associated with the operation of the wind turbine in the different operating modes of the selected sequence, wherein the lifetime consumption is calculated backwards from an end of the future period of time (end of life according to the sequence) to the current point in time to determine a required remaining lifetime of the wind turbine that is required at the current point in time to operate the wind turbine in accordance with the selected sequence until the end of the future period of time. Such calculation may provide a reliable reference that provides a good indication of the deviation and that can thus be used as a basis for selecting the actual operating mode.

Determining the estimated current end of life of the wind turbine may comprise adding to the current value of consumed lifetime the lifetime consumption associated with the operation of the wind turbine in the operating modes of the selected sequence (e.g. by adding the lifetime consumption for each time interval of the future period of time for the respective operating mode to the current consumed lifetime). From the current consumed lifetime, end of life may thus be estimated (termed 'estimated current end of life' herein). This may then be compared to the target end of life, i.e. the total lifetime as expected when operating in the selected sequence. It may thus be determined fast and efficiently if the current consumed lifetime is above or below the expectation.

In some embodiments, the actual operating mode may be selected from the plural different operating modes by employing a stochastic method that considers the respective deviation. The stochastic method may be configured to reduce the deviation, e.g. over multiple selections of the actual operating mode. Such stochastic method may provide a fast and efficient means of selection, and in particular may allow the actual consumed lifetime to be brought into alignment with the consumed lifetime expected from the sequence over multiple selection periods.

The plural different operating modes may include at least one or more first operating modes and one or more second operating modes, wherein the one or more first operating modes may have a lower lifetime consumption than the one or more second operating modes. The method may include adapting a probability to select a first operating mode or a second operating mode as the actual operating mode in dependence on the deviation (for example the deviation between target consumed lifetime and actual consumed lifetime, or target end of life and estimated current end of life). Adjusting the probability of selection facilitates considering changes in the deviation when selecting the actual operating mode. The first modes may be down-rating (less aggressive) modes resulting in a lower energy production, and the second modes may be up-rating (more aggressive) modes, resulting in a higher energy production by the wind turbine.

The method may include assigning a probability of selection to the one or more first operating modes and to the one or more second operating modes, wherein the probability depends on the deviation. For example, if the actual current consumed lifetime is higher than expected from selected sequence, a higher probability may be assigned to the one or more first operating modes (and vice versa). Optionally the probability may be assigned in further dependence on an external parameter (e.g. electricity price).

A probability for selection may for example be assigned to two or more first operating modes and/or a probability for selection may be assigned to two or more second operating modes. More than one mode may thus be available for driving the current consumed lifetime back to the expected value.

The probability may be distributed between the respective modes in dependence on the deviation and/or in dependence on an external parameter (e.g. electricity price). For example, a first probability may be assigned to the one or more first modes and a second probability may be assigned to the one or more second modes, in dependence on the deviation. The first probability may then be distributed among the one or more first operating modes in dependence on a current value of the external parameter and/or the second probability may be distributed among the one or more second operating modes in dependence on a current value of the external parameter. For a large value of the external parameter, a higher probability may be assigned to a mode having a higher energy production (more aggressive mode), and vice versa. It can thus be ensured on one hand that the actual consumed lifetime stays aligned with the consumed lifetime expected from the selected (optimal) sequence, while on the other hand ensuring that best use is made of the prevailing conditions (e.g., selecting with high probability a highly over-rated mode for a current high electricity price and stopping the wind turbine with high probability for a very low electricity price).

In an exemplary implementation, selecting the actual operating mode from the plural different operating modes under consideration of the deviation may comprise assigning a first portion (e.g. a part, share or a fraction) of a value range to one or more first operating modes and assigning a second different portion of the value range to one or more second operating modes, wherein the size of the first and second portions is chosen in dependence on the deviation; generating a random number within the value range; and selecting the operating mode that is associated with the portion of the value range in which the random number lies as the actual operating mode. The first and second factions may span the value range; they may not overlap. The one or more first operating modes may have a lower lifetime consumption than the one or more second operating modes (as also mentioned above). The borders of the value range may be chosen to correspond to borders the range of the expected consumed lifetime of the selected sequence within which the actual current consumed lifetime is to be kept. By adjusting the portions of the value range, the probability to select one of the first operating modes or one of the second operating modes can be adjusted in a simple and efficient manner in dependence on the deviation.

The value range may be configured to extend equally about a value that represents the consumed lifetime expected for the selected sequence of operating modes (e.g., the target consumed lifetime or the target end of life). The position of a boundary (e.g. epsilon, ε) between the first portion and the second portion within the value range may be determined in dependence on the deviation. The value of the boundary may correspond to the current value of consumed lifetime. The first range may extend from a first border of the value range to the boundary and the second portion may extend from the boundary to a second border of the value range.

If the deviation indicates that the current value of consumed lifetime is higher than the consumed lifetime expected from the selected sequence of operating modes, the boundary between the first portion and the second portion may be set such that the first portion (corresponding to modes having less lifetime consumption) spans a larger part of the value range than the second portion (and vice versa). It is thus made more likely that mode is chosen which has a low lifetime consumption, such as an LE mode or stop mode. A different selection probability can thus efficiently be assigned to the respective operating modes in dependence on the deviation.

As a simple example, if the current value of consumed lifetime is to be kept between +10% and −10% of the expected consumed lifetime, then the borders of a value range from 0 to 1 may be set to correspond to the respective values. The boundary between the first and second portions may then be set to the value in the range that corresponds to the current value of consumed lifetime, e.g. to 0.5 if there is no deviation, to 0.75 if the deviation is +5% and to 0.25 if the deviation is-5%. The sizes of the first and second portions and accordingly the probability for a random number to fall within the portion (and therefore for selection of the respective mode) can thus be adapted efficiently on the basis of the deviation.

In an embodiment, the actual operating mode is selected from the plural operating modes by an epsilon greedy algorithm, wherein a position of the epsilon parameter within a value range of the epsilon greedy algorithm is determined by the deviation.

It should be clear that the optimal first and second aspects of the present disclosure may be combined. For example, the wind turbine may be operated in accordance with the first aspect and embodiments thereof. An actual operating mode may thus be chosen that provides an overall optimal outcome for the optimization parameter in dependence on the current value of the external parameter. If the lifetime consumed by such operation deviates by a predefined amount from an expected consumed lifetime (which expected consumed lifetime may be based on an initially selected optimal sequence or on a sequence selected as part of the first aspect), then operation may be changed to a method in accordance with embodiments of the second aspect of the present disclosure, i.e. to a method in which the actual consumed lifetime is brought into alignment with the expected consumed lifetime.

In an embodiment, the wind turbine may thus be operated in a first short term optimization mode in which the wind turbine is operated by a method according to any of the embodiments of the first aspect disclosed herein, and upon a deviation between an actual current consumed lifetime of the wind turbine at a current point in time and a target consumed lifetime reaching or exceeding a threshold, the operation of the wind turbine may transition into a second short term optimization mode in which the wind turbine is operated by a method according to any of the embodiments of the second aspect disclosed herein. The benefits of both aspects may thus be realized.

According to a further embodiment of the invention, a control system for operating a wind turbine is provided, wherein the control system is configured to operate the wind turbine in plural different operating modes that differ by at least one of lifetime consumption of the wind turbine and energy production by the wind turbine. The control system is configured to perform any of the methods disclosed herein. The control system may in particular comprise a processing unit and a memory, wherein the memory stores control instructions which when executed by the processing unit cause the processing unit to perform any of the methods disclosed herein.

According to a further embodiment of the invention, a wind turbine is provided. The wind turbine comprises a control system, wherein the control system is configured to control operation of the wind turbine in plural different operating modes. The control system may have any of the configurations disclosed herein and may in particular be configured to perform any of the methods disclosed herein.

According to a further embodiment of the invention, a computer program for controlling the operation of a wind turbine is provided, wherein the computer program comprises control instructions which, when executed by a processing unit of a control system that controls the operation of the wind turbine, cause the processing unit to perform any of the methods disclosed herein. The computer program may be provided on a volatile or non-volatile data carrier or storage device, and may further be provided via a network connection. The computer program may be operated on any of the control systems disclosed herein.

Additionally and/or alternatively a further aspect is disclosed, and/or in particular as an embodiment of one of a precedingly described aspect(s) and/or embodiment(s), namely, a method for operating a wind turbine, in particular an offshore wind turbine, further in particular a floating offshore wind turbine, and/or for feeding electrical and/or chemical energy to an electricity and/or chemical grid, the method comprising the following steps:

executing steps of an embodiment or of a combination of embodiments of a method as disclosed supra, and/or operating an embodiment of a wind turbine as disclosed supra, generating, by the wind turbine, electrical power and/or electrical energy, and in particular generating at least partially from the electrical energy, further in particular, by transforming electrical energy into hydrogen by electrolysis, chemical energy in form of a gas or liquid, in particular in the form of hydrogen, transmitting, at least partially, the electrical power, the electrical energy, and/or the chemical energy to an energy receiving arrangement, in particular wherein the receiving arrangement is not positioned in international waters, is positioned onshore, and/or is positioned within a 12-miles-zone of a respective sovereign national state over which the respective state has jurisdiction, and supplying, at least partially, the electrical power, the electrical energy, and/or the chemical energy to an electrical and/or chemical utility grid, in particular to an onshore electrical and/or chemical utility grid and/or chemical/electrical storage.

The term "chemical energy" includes means for storing energy in a chemical substance such as in hydrogen. A chemical energy grid could for example be a gas (hydrogen) grid and/or storage device.

It is to be understood that the features mentioned above and those yet to be explained below can be used not only in the respective combinations indicated, but also in other combinations or in isolation, without leaving the scope of the present invention. In particular, the features of the different aspects and embodiments of the invention can be combined with each other unless noted to the contrary.

BRIEF DESCRIPTION OF THE DRAWINGS

The forgoing and other features and advantages of the invention will become further apparent from the following detailed description read in conjunction with the accompanying drawings. In the drawings, like reference numerals refer to like elements.

FIG. 8 is a schematic diagram that illustrate the estimated dependency of the optimization parameter on the current value of an external parameter for different current operating modes corresponding to different (group optimal) sequences of operating modes.

DETAILED DESCRIPTION

Figure 1:
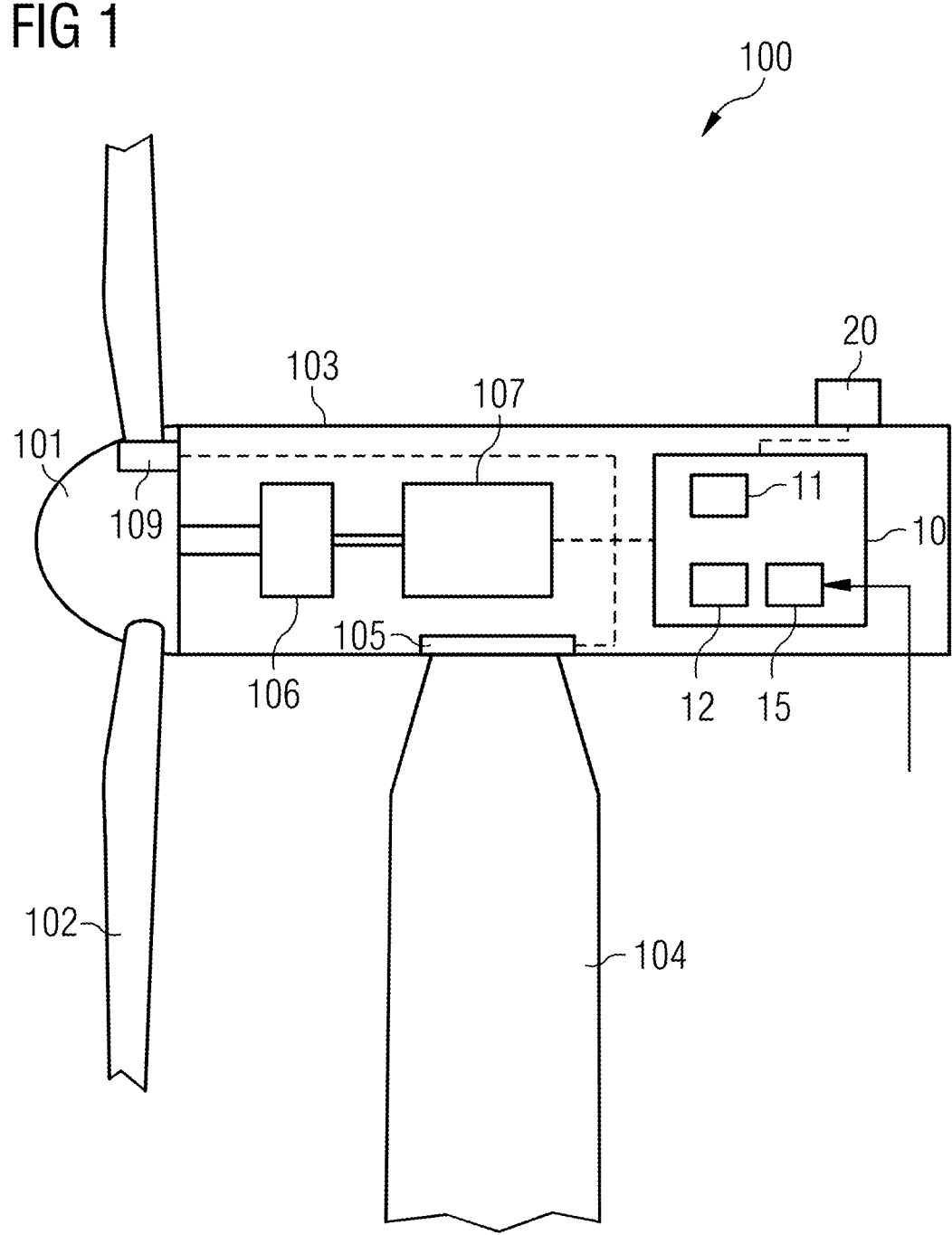
FIG. 1 is a schematic drawing showing a wind turbine including a control system according to an embodiment.
Figure 2:
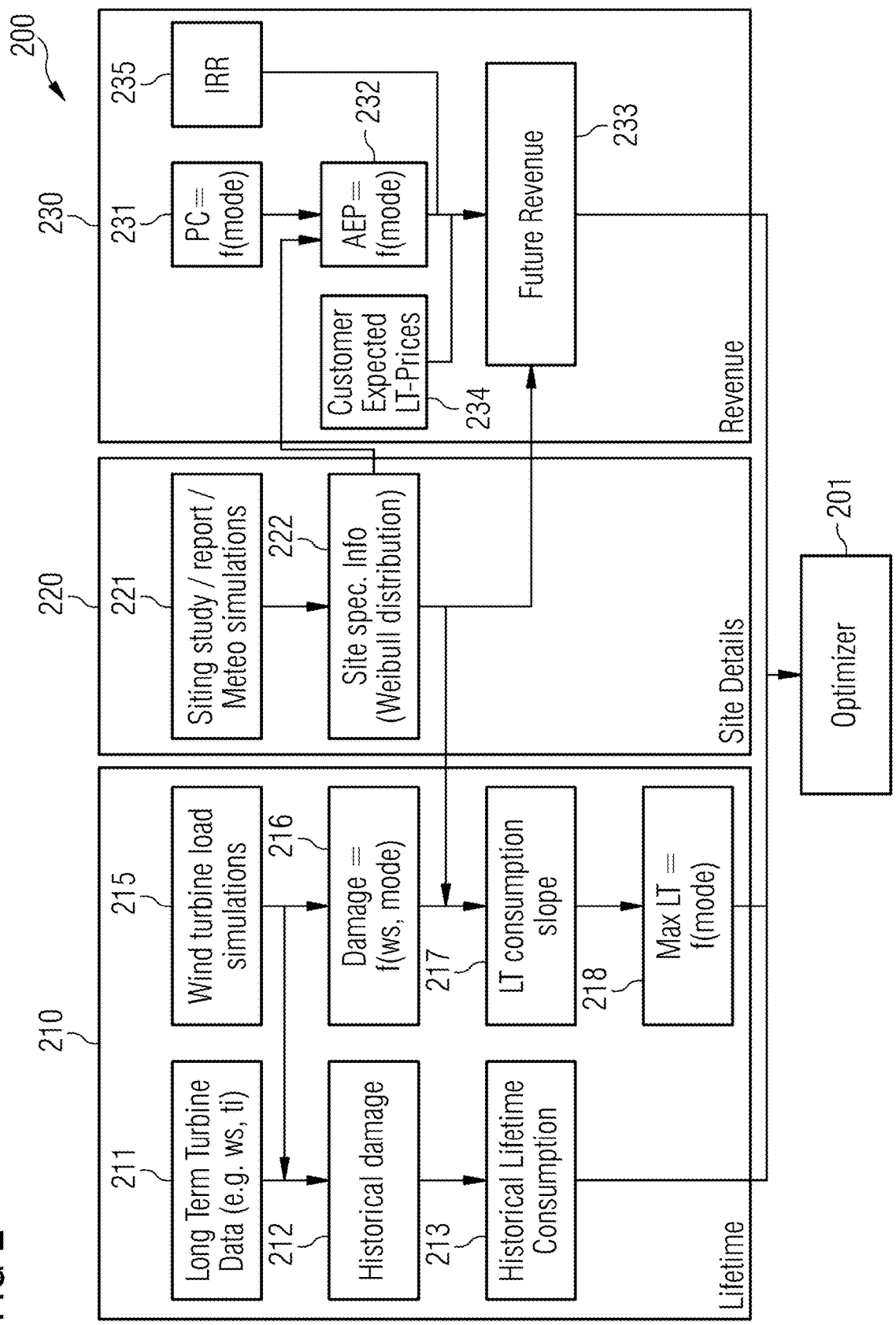
FIG. 2 is a schematic drawing showing functional blocks of a control system according to an embodiment.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

FIG. 1 schematically shows a wind turbine 100 that includes a rotor 101 with rotor blades 102. A nacelle 103 of the wind turbine 100 is mounted to a wind turbine tower 104 and is rotatable by means of a yaw drive 105. Wind turbine 100 may further include a generator 106, optionally a gear box (not shown), and a converter 107. In operation, wind energy is converted into rotational mechanical energy by the blades 102 of the rotor, wherein rotation of the rotor 101 turns the generator 106 which converts the mechanical energy into electrical energy. Converter 107 may provide AC voltage at the desired AC frequency. Although FIG. 1 illustrates a full converter (FC) topology, different topologies, such as a DFIG topology may also be employed. A transformer receiving electrical power from converter 107 and other components common to such wind turbine (not shown) may certainly be present. The wind turbine may be coupled to a power grid to provide electrical power to the power grid, e.g. via a collector network of a wind farm or more directly.

The wind turbine is controlled by a control system 10 that includes a processing unit 11 and a memory 12. The processing unit 11 may be any type of processor, such as a microprocessor, an application specific integrated circuit, a digital signal processor or the like. Memory 12 may include volatile and non-volatile memory, in particular RAM, ROM, EEPROM, FLASH-memory, hard disc drives and the like. Control system 10 may further include a communication interface 15 for communicating with external data processing entities, via which the wind turbine may receive external data, in particular data values of one or more external parameters, such as environmental conditions (e.g., wind conditions, wind speed), energy demand, electricity prices, grid related information, statistical and/or historical information, and the like. Control system 10 may further include a user interface (not shown) and other communication interfaces, e.g. data acquisition interfaces, for example for receiving data from one or more sensors 20 of the wind turbine. Such sensors may be configured to measure environmental parameters (e.g. wind conditions, such as speed, direction), wind turbine loading (e.g. strain, bending moments or the like) and other information beneficial for operating the wind turbine.

The control system 10 is configured to control the wind turbine in accordance with plural different modes of operation that differ in at least one of energy production and lifetime consumption of the wind turbine, preferably in both. To operate the wind turbine in these different modes, the control system 10 may for example control at least one, preferably all of the pitch drive 109 of the blades (pitch angle control), the yaw drive 105, the converter 107 and the generator 106 (e.g. via the converter), and other controllable components of the wind turbine.

Control system 10 may operate the wind turbine in one or more first operating modes, which are down-rating modes and which conserve lifetime of the wind turbine, e.g. by rotating rotor 101 at lower speed (e.g. pitching out blades 102). The first operating modes may include a stop mode (energy production of the wind turbine at least for export purposes is stopped), and an LE mode. In the LE mode, the control system may be configured to detect turbulences at the wind turbine, and if turbulences above a predefined threshold are detected, to reduce the output power of the wind turbine. In the LE mode, the fatigue load on the wind turbine may thus be reduced at the expense of energy production. Optionally, the first operating modes may include a simple curtailment mode in which the output power of the wind turbine is curtailed (e.g. by pitching out the rotor blades, which reduces stress on the rotor and the wind turbine) and/or a HWRT (high wind ride through) mode. In the HWRT mode, the control system 10 may be configured to perform a load based reduction in the output power above a predefined wind speed. For example, if the wind speed exceeds a predefined value (e.g., 23 m/s) for a certain period of time, the rotational speed of the rotor and the power output of the wind turbine may be gradually reduced. The first operating modes may further include a turbine load control (TLC) mode. The control system 10 may implement a turbine load control system that continuously monitors the structural loading on the wind turbine, and if normal operating values are exceeded by the measured loads, the control system may automatically regulate the operation of the wind turbine to bring the loads back into the design envelope, e.g. by reducing the rotational speed of the rotor (pitching out of the rotor blades).

Control system 10 may further operate the wind turbine in one or more second operating modes, which are up-rating modes and which increase energy production of the wind turbine, generally at the expense of wind turbine lifetime (increased lifetime consumption), for example by allowing higher rotor speeds than the rated rotor speed. The first operating modes may include first and second performance enhanced (PE) modes. The PE mode may increase the energy production of the wind turbine by increasing a power limit under predetermined conditions. At high wind speeds, the wind turbine may operate at a limit of output power (e.g. rated power), yet the operation may occur below the load limit for structural loads of the wind turbine. In the PE mode, the control system increases the rotational speed of the rotor proportional to the increase in output power. The net power production may for example be increased by up to 5% (PE5) or 10% (PE10) in the respective PE mode.

Control system 10 may implement other than the first and second operating modes, such as a baseline mode in which the wind turbine is operated with nominal parameters (i.e. normal operation). Preferably, control system 10 is configured to operate the wind turbine at least in the baseline mode, the stop mode, the LE mode and two different PE modes, but two modes (stop and baseline) may be sufficient.

Control system 10 may be implemented by one or more controllers; it may be implemented by a wind turbine controller of wind turbine 100, a wind farm controller, an external server, or a combination thereof. Some parts of the disclosed methods (e.g. overall optimization) may be carried out by one controller (e.g. wind farm controller), and other parts may be carried out by another controller (e.g. wind turbine controller), or a method may be carried out by a single controller.

Control system 10 is configured to perform a long term (LT) optimization, in which it determines one or more optimal sequences of operating modes, and to perform a short term (ST) optimization in which, based on the results of the LT optimization, the actual operating mode for the current point in time is selected and used to operate the wind turbine. Two different ways of performing the short term optimization are disclosed herein, which can be used in isolation or can be combined to synergistically improve the performance of the wind turbine. First, the long term optimization is described.

The control system 10 may implement an optimizer 200, which considers the operational history of the turbine (i.e., lifetime consumption), future lifetime consumption depending on operation mode of the turbine and environmental conditions, statistical and short-term prediction of environmental condition and economical value. The long-term optimization determines a sequence of operating modes for a future period of time (which may include a sequence of fixed time intervals, for example years or months) until end of life of the wind turbine, for which an optimization parameter estimated for the sequence reaches an optimization target. The optimization parameter is for example energy production, meeting of energy demand, or revenue, in particular a net present value (NPV) that reflects the sum of discounted revenue over the time intervals of the future period of time.

Figure 3:
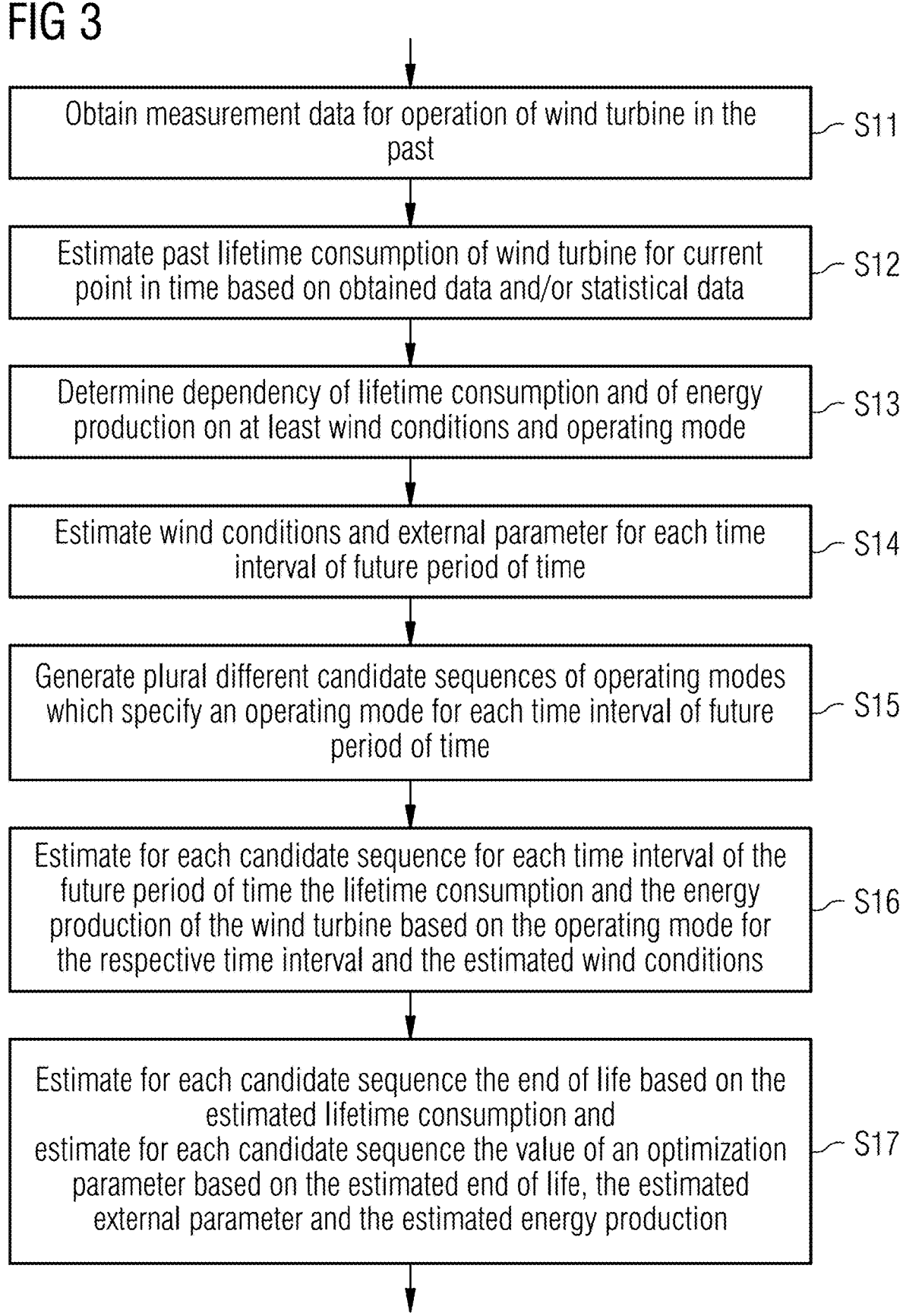
FIG. 3 is a flow diagram illustrating a method of operating a wind turbine according to an embodiment, which comprises the determining of a sequence of operating modes (as part of a long term optimization).

FIG. 3 illustrates an embodiment of the long term optimization method that may be performed by optimizer 200. In step S11, measurement data for operation of the wind turbine in the past is obtained. In step S12, the past lifetime consumption of the wind turbine is estimated for a current point in time based on the obtained data and/or on statistical data. These steps may be performed by lifetime estimator 210, that obtains for example long term wind turbine data 211 (e.g. wind speed (ws), turbulence intensity (ti), power produced, rotor speed, nacelle accelerations etc.). Lifetime estimator 210 may include a load simulation block 215 (which may use a load simulation and/or an aeroelastic model of the wind turbine) that is configured to determine, based on the historical data, the lifetime consumed by the wind turbine and to predict the future lifetime consumption for the different operating modes of the wind turbine. By the long term wind turbine data 211 and the simulation block 215, the historical damage 212 can be derived, and the historical lifetime consumption 213 is estimated (step S12 of FIG. 3). The consumed lifetime for the current point in time may thus be obtained.

Further, based on the load simulation block 215, the dependency of damage or lifetime consumption on the wind speed (and/or other ambient conditions, such as turbulence intensity, temperature, wind shear, wind direction etc.) and on the operating mode can be derived, the dependency being provided in block 216 (step S13). Furthermore, sensor data for the turbine such as rotor speed, generated power, strains etc. may be used in a model for the damage that may determine the past damage suffered by the turbine in an accurate way. The optimizer 200 further comprises the environmental conditions estimator 220, which uses external data 221 (which may include a siting study, siting report, meteorological simulations, met-mast data, meso-scale data and the like) and which further uses site specific information 222 (which may include a site-specific Weibull distribution, wind rose, etc.) to estimate future wind conditions, such as wind speed. The wind distribution for the site of the wind turbine can thus be analyzed and can be estimated for the future.

The optimizer 200 further includes a parameter estimator 230 that is configured to estimate the optimization parameter in dependence on the operating mode and the environmental conditions. As an example, future revenue may be estimated by estimator 230, but other optimization parameters, such as energy production, or meeting of energy demand, may be employed as well. Power curve block 231 provides the power curve of the wind turbine for each operating mode. Energy production estimator 232 estimates the energy production by the wind turbine from the power curve in dependence on the operating mode. The estimation may be made for a period that corresponds to a time interval of the future period of time, e.g. for a year, so that the annual energy production (AEP) for each operating mode may be estimated for each time interval (see also step S13). The estimation may further employ the environmental data for the respective time interval from estimator 220, in particular wind distribution. Estimation block 233 may estimate the optimization parameter, e.g. for the time interval in dependence on the respective operating mode, for which further data may be employed. An external parameter forecast unit 234 may be provided that estimates an external parameter for each time interval for the future period of time (see also step S14). If revenue is the optimization parameter, the forecast unit 234 may for example provide an electricity price forecast, for example from customer expectations on future prices. Additional data block 235 may provide further relevant information for estimating the optimization parameter, such as internal rate of return when optimizing revenue. Accordingly, a precise estimate of the optimization parameter for different operating modes and different time intervals may be obtained by estimator 230.

The optimization unit 201 may now determine one or more, preferably plural, sequences of operating modes of the wind turbine for the future period of time. As an example, estimations may be performed for all time intervals of the future period of time and for all combinations of operating modes. The estimation may for example end for a particular sequence if the lifetime of the wind turbine has been consumed. The optimization unit 201 may compile different candidate sequences, each candidate defining one operating mode for each time interval until the end of life of the wind turbine (step S15).

The lifetime estimator 210 may include a lifetime consumption block 217 that determines the lifetime consumption (or damage) for the wind turbine in dependence on the estimated environmental conditions (from estimator 220, e.g. wind speed, for example statistical wind speed distributions obtained from the site or meso-scale data) and the respective operating mode. The lifetime consumption may refer to the rate at which lifetime is consumed in the respective mode, so that the different operating modes may have different slopes in a lifetime diagram, and unit 217 may determine this rate or slope per mode (for example, driving the wind turbine harder or in high wind conditions results in a higher slope of lifetime consumption during the time interval). For a particular candidate sequence, the lifetime consumption in each time interval can thus be estimated. The end of life estimator 218 determines the maximum lifetime (and thus the end of life) of the wind turbine for the respective sequence of operating modes, i.e. determines the time interval in which the lifetime of the wind turbine has been consumed.

Figure 5:
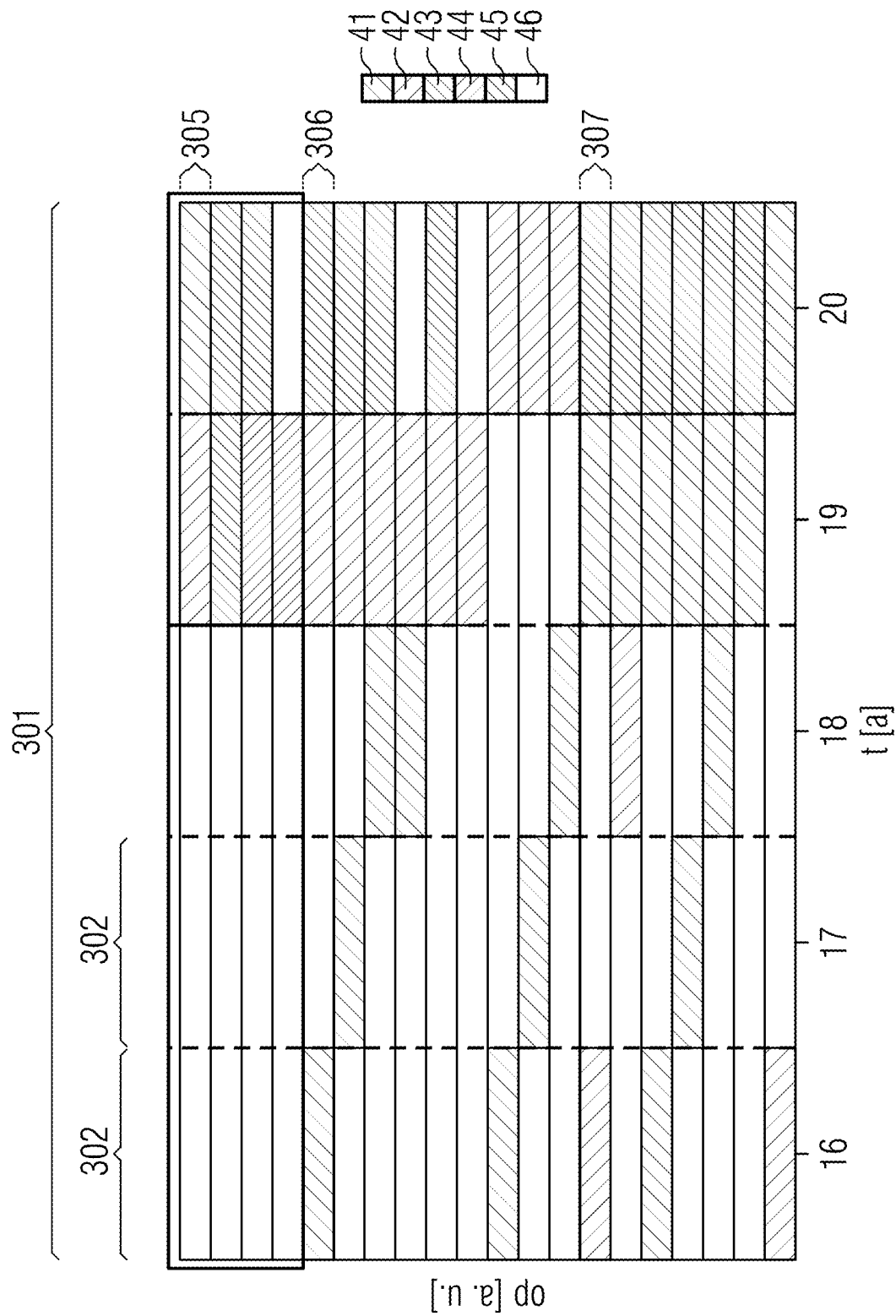
FIG. 5 is a schematic diagram that graphically illustrates different candidate sequences of operating modes sorted according to the value of the estimated optimization parameter.

For each candidate sequence of operating modes, the value of the optimization parameter is determined at the end of life of the wind turbine (i.e. at the end of the future period of time of the respective wind turbine). For example, the annual discounted revenue is calculated and therefrom, the net present value (NPV) may be derived. The candidate sequences may then be sorted in a list by the value of the optimization parameter (e.g. highest value may be ranked first if optimization target is maximization of the optimization parameter, e.g. revenue). A result is illustrated in FIG. 5, which shows a future period of time 301 having 5 time intervals 302, each corresponding to a year. The horizontal axis is the time axis in years (a), counting the year from the commissioning of the wind turbine. The vertical axis represents the value of the optimization parameter op in arbitrary units (a.u.), which may for example be revenue. The candidate sequence of operating modes 305 that results in the highest value of the estimated optimization parameter is shown on top. Note that for some sequences (e.g. 306, 307), the lifetime of the wind turbine has expired prior to year 20, wherein the hatching in FIG. 5 indicated by reference numeral 43 corresponds to the wind turbine being "dead". Mode 41 is the LE mode, mode 42 is the baseline mode, mode 44 is the PE5 mode, mode 45 is the PE10 mode, and mode 46 is the stop mode. As can be seen, the sequence 305 resulting in the highest value stops the wind turbine in years 16, 17 and 18 and operates in baseline and LE modes in years 19 and 20. Note that FIG. 5 shows only a subset of the candidate sequences.

Figure 4:
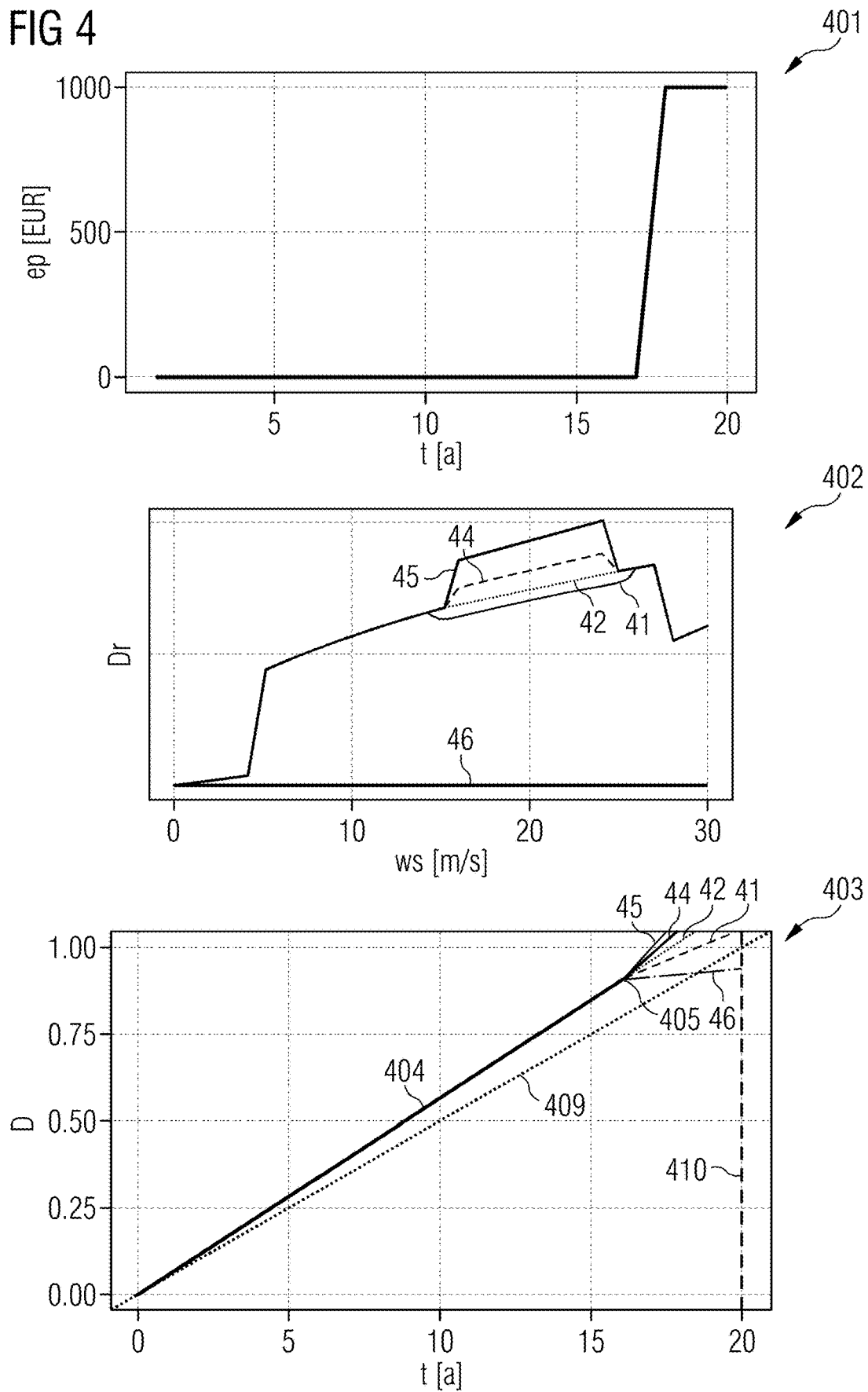
FIG. 4 shows schematic diagrams that illustrate different input parameters for an optimization and a development of the optimization according to an embodiment.

FIG. 4 shows diagrams that illustrate different input parameters for the optimization and the development of the optimization. The upper graph 401 shows an estimation of the external parameter ep for the future period of time as provided by block 234, e.g. the electricity price per MWh in Euro (expected future price assumption). Diagram 402 shows the damage rate (or lifetime consumption) Dr in units of a damage value/year in dependence on the wind speed for different operating modes. As can be seen, at higher wind speed, the up-rating modes 44, 45 result in higher damage to the wind turbine, whereas the stop mode 46 results in almost zero damage.

The last diagram 403 of FIG. 4 illustrates the cumulated damage/or consumed lifetime of the wind turbine over time t in years (a) up to the current point in time 405, and further illustrates the estimated future damage (lifetime consumption) for different operating modes, showing the different slopes per mode. The value range is chosen so that D=0 corresponds to no damage and D=1 corresponds to the consumption of the lifetime (i.e. to the end of life). Consumed lifetime may be a health indicator for the wind turbine that indicates the health status as a numerical value, e.g. as a value between 0 and 1, wherein 1 means that the wind turbine is damaged to an extent that it is no longer operational. The thick solid line 404 indicates previous damage which has been cumulated over the turbine's life up to the current point in time 405. The diagonal dashed line 409 indicates the design case. It is assumed that the wind turbine stops operating once the cumulated damage (vertical axis) reaches a value of 1. In the example, the current value of consumed lifetime is above the design case. This indicates that the wind turbine has been operated more aggressively in its past than the design case would have expected. If the wind turbine would continue operating in this fashion, it would not reach the design lifetime, which is shown here as a black vertical line 410. The different operating modes result in different slopes in diagram 403, as calculated by block 217. Diagram 403 visually indicates if the wind turbine will reach its design lifetime 410 when operating in a specific operation mode.

In the present example, the current year is year 16, so that there are four more years in which the wind turbine can be operated. Due to the price assumption shown in diagram 401 (low prices in the first 18 years and high prices in the remaining years until end of life), the optimization unit estimates the highest value of the optimization parameter for the sequence that stops the turbine in years 16, 17, and 18, and that operates the turbine in the last two years, when prices are high with less aggressive modes. As can be seen from FIG. 5, when operating in a more aggressive mode in year 19, the wind turbine reaches its end of life and is dead in year 20.

It should be clear that besides calculating the optimization parameter for all possible combinations of modes in the sequence, an optimization algorithm, such as a search algorithm, or an algorithm from the field of reinforcement learning, may also be used to find the sequence of modes that results in the highest optimization parameter. The above explanations apply correspondingly to such method.

The result of the optimization unit 201, e.g. the determined one or plural sequences of operating modes with their associated estimated optimization parameter, may either be selected and set for operating the wind turbine (e.g. the sequence which meets the optimization target, e.g. results in the highest revenue, may be selected as an optimal sequence for operation), and/or the results provided by the optimization unit 201 may be used in the further short term optimization.

Based on the one or more determined sequences of operating modes, the method may further determine an actual operating mode for the wind turbine and operate the wind turbine in the actual operating mode, wherein the actual operating mode is allowed to deviate for example from the operating mode of the sequence determined by the long term optimizer to result in the highest/best estimated value of the optimization parameter (e.g. a globally optimal sequence). By such short-term optimization, it may be determined if another operating mode exists than the one determined from the long-term optimization that results in a better value of the optimization parameter, e.g. in a higher revenue, in view of the current conditions, e.g. for a current value of an external parameter such as wind speed or electricity price, and/or a current value of an operating parameter, such as current consumed lifetime.

According to a first aspect, a current value for an external parameter may be used for short term optimization. Such a current value may be a value obtained by receiving the value by unit 15 or by a short term prediction, wherein the current value may include a current value for a current point in time and/or a value for a second time period for the near future, e.g. that starts at the current point in time and extends into the future, but is shorter than the future first period of time 301 and preferably shorter than a time interval 302 thereof. The current value of the external parameter (e.g. electricity price) may thus be more reliable than the estimated value of the external parameter used in the long-term optimization. So for example, if the wind turbine is operated in the determined optimal sequence in a stop mode for year 17 due to the low electricity price, as in the example of FIGS. 4 and 5, and the current electricity price raises to a value that is much higher than the expected price illustrated in the first diagram 701 of FIG. 7, then the short term optimization may select a different actual operating mode to operate the wind turbine if the price is high enough. Loss of energy production and revenue may thereby be avoided.

In the present example, the short-term optimization may make use of the value of the lifetime consumption estimated in the long-term optimization, as outlined above.

Figure 6:
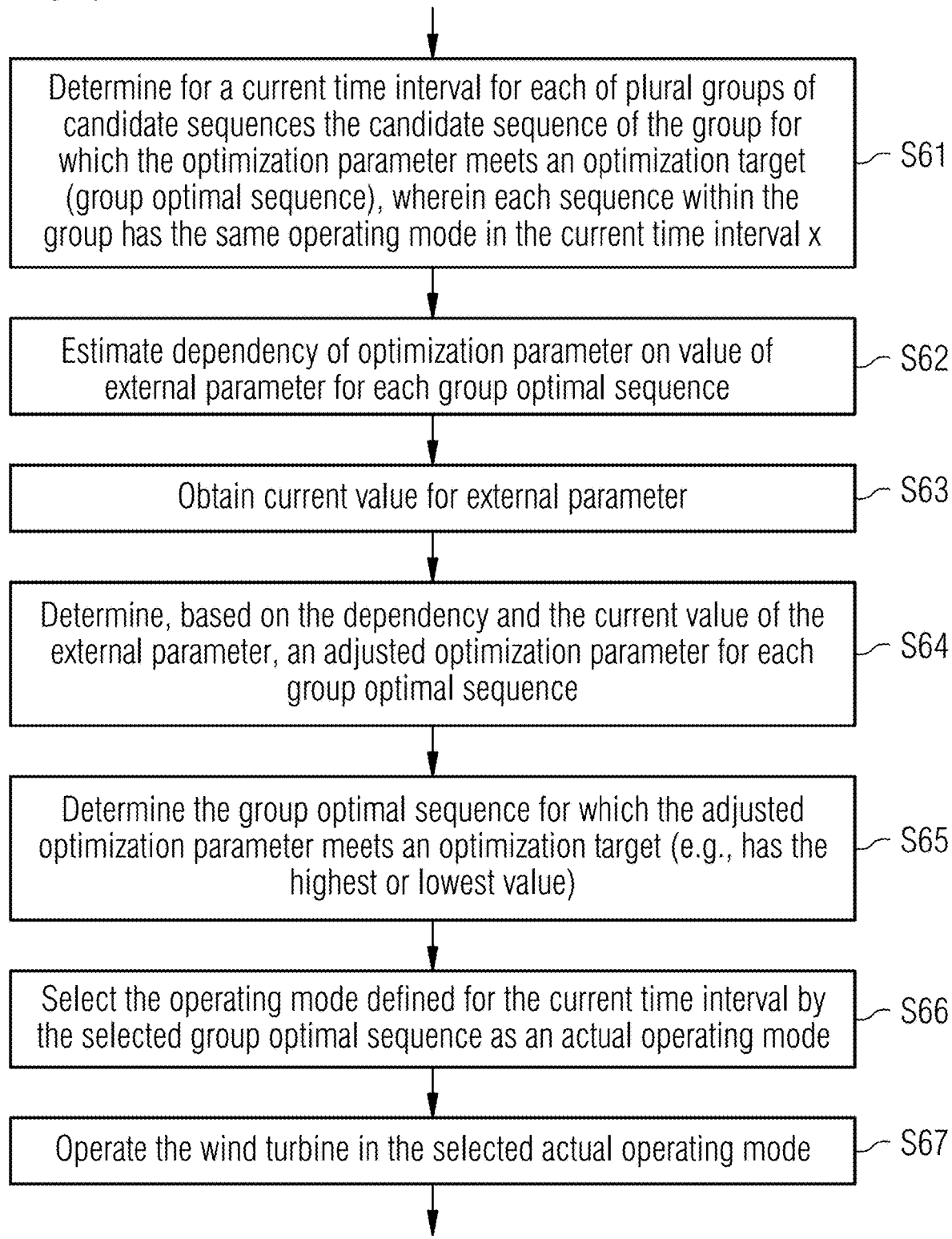
FIG. 6 is a flow diagram illustrating a method of determining an actual operating mode for the wind turbine based on an external parameter and the determined sequence of operating states according to an embodiment.
Figure 7:
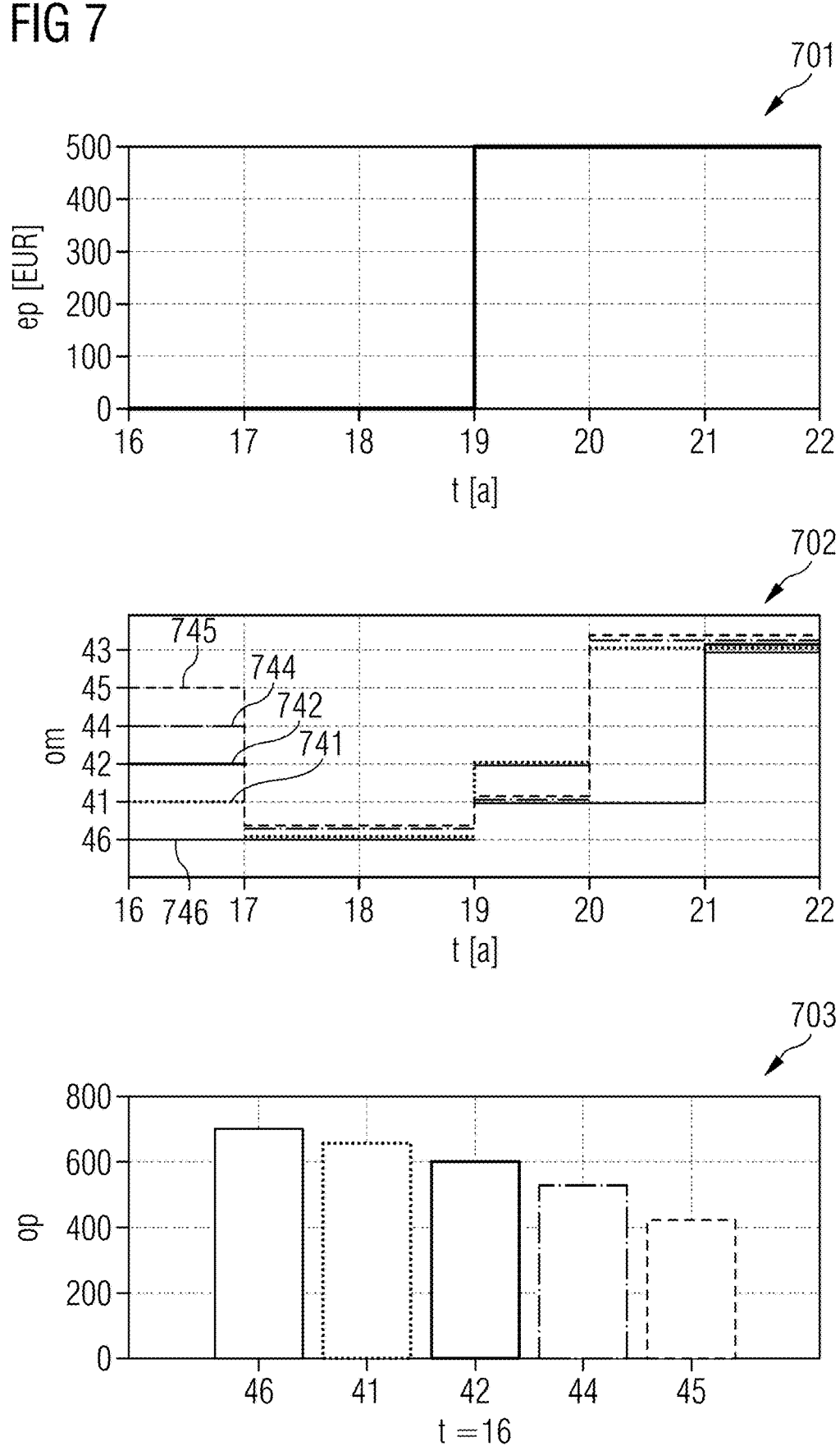
FIG. 7 shows schematic diagrams that illustrate an input parameter, operating modes om for each time interval for the group optimal sequences and the optimization parameter for different starting operating modes in accordance with the method of FIG. 6.

FIG. 6 shows a flow diagram illustrating an example of a respective method of determining the actual operating mode. As part of determining a sequence of operating modes in accordance with the method explained above with respect to FIGS. 3-5, an optimal sequence is determined for each of different groups of candidate sequences (step S61), wherein the optimal sequence for the group is the sequence for which the optimization parameter best meets an optimization target (e.g. maximization of energy production or revenue, as mentioned above). Such sequence may be termed 'group optimal sequence'. Each group comprises the sequences that define the same operating mode for the current time interval, and thus for the current point in time, i.e. all sequences starting (from the current point in time) with the same mode may form a group. The candidate sequences within in each group are different (differ in at least one mode for a time interval). This way, an optimal sequence can be obtained for operation of the wind turbine in each of the available modes at the current point in time. It is noted that the respective data may be available from the estimation performed by the long-term optimization, in particular from the table illustrated in FIG. 5 (which shows only a portion of the calculated candidate sequences). All sequences that start with the stop mode 46 may form a group, and the one with the highest value of the optimization parameter is selected as the group optimal sequence. Sequences 305, 306 and 307 may be the group optimal sequences for the group starting in stop mode, LE mode and baseline mode, respectively. For the different operating modes at the current point in time, the diagram 702 of FIG. 7 illustrates the operating mode om for each time interval for the group optimal sequences 745 (start in PE10 mode 45), 744 (start in PE5 mode 44), 742 (start in baseline mode 42), 741 (start in LE mode 41), and 746 (start in stop mode 46). For each of the group optimal sequences 741-746, the estimated optimization parameter and estimated lifetime consumption and thus end of life are known, as illustrated in diagrams 702 and 703 of FIG. 7. The diagram 703 illustrates for the different operating modes for the current time interval (year 16) the value of the optimization parameter op for the lifetime of the wind turbine as determined by the corresponding group optimal sequence. As can be seen, and as expected from the long term optimization, the group optimal mode starting with the stop mode in the current time interval achieves the highest value for the optimization parameter.

In step S62, a dependency of the optimization parameter op on the value of external parameter is estimated for each group optimal sequence. For example, a linear dependency may be assumed. This is illustrated in FIG. 8. The slope of the linear dependency may be determined in dependence on the respective operating mode. As an example, the optimization parameter op may be revenue (e.g. NPV). The external parameter ep may be electricity price. The revenue for the current time interval will depend on the electricity price and the energy production of the wind turbine in the time interval, which will in turn depend on the operating mode (and the wind conditions, which are however the same for each group optimal sequence). Modes having a higher energy production will naturally result in a stronger dependency of the revenue on the electricity price, so that the slope of the dependency may be determined by the energy production estimated for the respective operating mode. Further, from the estimated value of the external parameter, as used in the long term optimization, the optimization parameter for this value of the external parameter is known. Knowing this value and the slope of the linear dependency, it can be estimated how the current value of the external parameter influences the optimization parameter op for each of the candidate optimal sequences, as shown in diagram 801 of FIG. 8. Different linear dependencies 841-846 between the optimization parameter and the external parameter for the different corresponding group optimal sequences 741-746 are thus obtained for the current time interval.

As can be seen in diagram 801, the electricity price has no influence on the optimization parameter for group optimal sequence 746/846, since this sequence defines a stop mode for the current time interval, so that no energy is produced (and no revenue generated, no matter what the energy price is). On the other hand, for the group optimal sequence 745/845 that starts in the aggressive mode (e.g. PE10), there is a strong dependency on the electricity price. As can be seen from the diagram 801, depending on the current value of the electricity price, a different group optimal sequence will result in the highest value of the optimization parameter.

In step S63, a current value is obtained for the external parameter. The value may for example be received via communication interface 15, e.g. from an external service provider, or may be measured, e.g. by sensor 20 (for example current wind speed). In step S64, based on the current value and the (estimated linear) dependency between the optimization parameter and the external parameter (as illustrated in FIG. 8), an adjusted optimization parameter for each group optimal sequence is estimated. The term 'adjusted optimization parameter' indicates that the value corresponds to the optimization parameter derived from the long term estimation, which is adjusted for the difference between the estimated value and the current value of the external parameter. For example, for a current value of the external parameter of 10, the value of the optimization parameter for ep=10 can be taken from diagram 801 for each of the group optimal sequences. It should be clear that obtaining the adjusted optimization parameter is performed numerically by control system 10 (i.e. without requiring the diagram).

In step S65, the group optimal sequence is determined for which the adjusted optimization parameter meets an optimization target, for example has the highest value. In the example of FIG. 8, for ep<10 EUR/MWh, group optimal sequence 746 defining the stop mode for the current time interval results in the highest value of op; for 10 EUR/

MWh<ep<15 EUR/MWh, sequence 741 results in the highest op (starting with LE); for 15 EUR/MWh<ep<20 EUR/MWh, sequence 742 results in the highest op (starting with baseline); for 20 EUR/MWh<ep<25 EUR/MWh, sequence 744 results in the highest op (starting with PE5); and for ep>25 EUR/MWh, sequence 745 results in the highest op (starting with PE10).

In step S66, the operating mode that is defined for the current time interval by the selected group optimal sequence is set as the actual operating mode. For example, for ep=22 EUR, the group optimal sequence 744 results in the highest value of the optimization parameter, and the operating mode 44 (PE5 mode), which this sequence 744 defines for the current time interval, is set as the actual operating mode. In step S67, the wind turbine is then operated in the actual operating mode.

Accordingly, the method allows determining the actual operating mode in such a way that the optimization parameter is optimized in the long term, while deviations from such long term strategy are allowed to make use of short term effects, in particular of deviations between the estimation of the external parameter (on which the long term optimization is based) and the current value of the external parameter. The short-term optimization may thus select the actual operation mode which results in the best optimization result, e.g. in the maximum revenue (e.g. NPV). The actual operating mode may be updated repeatedly within a time interval, e.g. when obtaining an updated current value of the external parameter or with the periodicity mentioned above.

It should be clear that the method may not only be performed by using an optimization parameter in form of revenue, but also other optimization parameters are conceivable, such as energy production. The external parameter may in such case be wind speed. Depending on the current value of wind speed, an adjusted energy production may thus be determined for each group optimal sequence and the group optimal sequence resulting in the highest energy production may be selected and may determine the actual operating mode.

Additionally or alternatively, the method may further include the determining of the actual operating mode using the method as described hereinabove in accordance with the second aspect. The determining of the actual operating mode may for example include determining the operating mode in accordance with the first aspect (e.g. as described with respect to FIGS. 6-8), and upon a deviation between a current value of consumed lifetime and an expected consumed lifetime (e.g. defined by a determined sequence of operating modes) exceeding a predefined (static or dynamic) value, determining the operating mode in accordance with the second aspect. By such method, it may be ensured that the lifetime consumption of the wind turbine is not excessive, e.g. during a longer period of very high energy prices, in which the method of the first aspect may tend to operate the wind turbine very aggressively. Upon the deviation dropping below a second predefined (dynamic or static) value, operation may continue in accordance with the first aspect.

When operating the wind turbine in accordance with the second aspect, the deviation in consumed lifetime may be determined for the current point in time (e.g. by forward or backward calculation using the determined sequence), and the probability for selecting a particular operating mode may be made dependent on the deviation, in particular so as to reduce the deviation. The determined sequence may in such case for example be a globally optimal sequence or a currently selected group optimal sequence. Accordingly, both aspects interact synergistically to ensure that the lifetime consumption is not excessive, while at the same time maximizing the optimization parameter under consideration of the current environmental conditions, such as electricity price or wind speed.

While specific embodiments are disclosed herein, various changes and modifications can be made without departing from the scope of the invention. The present embodiments are to be considered in all respects as illustrative and non-restrictive, and all changes coming within the meaning and equivalency range of the appended claims are intended to be embraced therein.

The invention claimed is:

1. A method of operating a wind turbine, wherein the wind turbine is operable in plural different operating modes that differ by at least one of lifetime consumption of the wind turbine and energy production by the wind turbine, the method comprising:
   determining, in an optimization procedure, a sequence of said operating modes for a future period of time, wherein determining the sequence comprises estimating, for the future period of time and for each of plural different sequences that include different combinations of operating modes, an optimization parameter from at least an estimated lifetime consumption and an estimated energy production associated with the operation in the operating modes of a respective sequence, wherein the estimation of the optimization parameter is further based on at least one estimated external parameter;
   obtaining a current value for the at least one external parameter;
   determining an actual operating mode for the wind turbine for a current point in time, wherein the determining of the actual operating mode comprises
      estimating an adjusted optimization parameter for each of the plural different sequences of operating modes that define an operating mode at the current point in time and for which the optimization parameter has been estimated in the optimization procedure,
      wherein the adjusted optimization parameter is estimated for the respective sequence of operating modes by adjusting the optimization parameter, which has been estimated in the optimization procedure for the respective sequence, for the current value of the at least one external parameter, and
      further comprises selecting one of the different operating modes as the determined actual operating mode based on the estimated adjusted optimization parameter, wherein the optimization procedure is not repeated for determining the actual operating mode; and
   operating the wind turbine in the determined actual operating mode,
   wherein the obtaining of the current value, the determining of the actual operating mode, and the operating of the wind turbine in the determined actual operating mode are performed repeatedly using the same optimization parameter estimated for the plural different sequences of operating modes in the optimization procedure.

2. The method according to claim 1, wherein selecting one of the different operating modes as the actual operating mode based on the estimated adjusted optimization parameter comprises selecting the operating mode for which operation at the current point in time results in the adjusted optimization parameter that meets an optimization target.

3. The method according to claim 2, wherein the adjusted optimization parameter has a maximum or minimum value.

4. The method according to claim 1, wherein estimating the adjusted optimization parameter comprises:
for the different sequences of operating modes that differ at least by their operating mode for the current point in time, estimating a dependency of the optimization parameter derived in the optimization procedure for the respective sequence on the value of the at least one external parameter, and estimating the adjusted optimization parameter for each of said sequences for the obtained current value of the at least one external parameter using the dependency.

5. The method according to claim 1, wherein the plural different sequences of operating modes comprise plural groups, each group comprising plural different candidate sequences of operating modes, wherein the sequences within the same group comprise the same operating mode for a current time interval of the future period of time, wherein the sequences of different groups comprise a different operating mode for the current time interval, and wherein the optimization parameter is estimated, in the optimization procedure, for each of the different candidate sequences within each group.

6. The method according to claim 5, wherein determining the sequence of operating modes for the future period of time comprises determining an optimal sequence for each of the different groups by selecting a candidate sequence from the respective group for which the optimization parameter meets an optimization target, wherein the adjusted optimization parameter is estimated for each of the optimal sequences of the groups.

7. The method accord to claim 6, wherein for the optimal sequence of each group, a dependency of the optimization parameter on the value of the at least one external parameter is estimated to determine the adjusted optimization parameter for the respective optimal sequence.

8. The method according to claim 7, wherein a slope or another parameter of the dependency is determined to be dependent on an operating parameter estimated for the operating mode at the current point in time for which the adjusted optimization parameter is estimated.

9. The method according to claim 8, wherein the operating parameter is an energy production estimated for the respective operating mode.

10. The method according to claim 1, wherein estimating the adjusted optimization parameter comprises employing a linear dependency or a non-linear dependency between the value of the optimization parameter and the value of the at least one external parameter.

11. The method according to claim 1, wherein estimating the adjusted optimization parameter for the respective sequence of operating modes comprises:
obtaining the optimization parameter estimated in the optimization procedure for the sequence that includes a respective operating mode for a current time interval, the estimation being based on the at least one estimated external parameter for the current time interval; and
determining the adjusted optimization parameter by adjusting the optimization parameter using the current value of the at least one external parameter and an estimated dependency between the optimization parameter and the at least one external parameter for the current time interval.

12. The method according to claim 11, further comprising estimating the energy production of the wind turbine within the current time interval when operating in the respective operating mode, and estimating the dependency between the optimization parameter and the at least one external parameter from at least the energy production in the current time interval.

13. The method according to claim 1, wherein the at least one external parameter is at least one of wind speed and electricity price.

14. A wind turbine, wherein the wind turbine is operable in plural different operating modes that differ by at least one of lifetime consumption of the wind turbine and energy production by the wind turbine, the wind turbine comprising:
a rotor blade coupled to a rotor for rotation;
a generator coupled to the rotor to generate electrical energy in response to rotation of the rotor;
a convertor coupled to the generator to receive the electrical energy and to discharge an output electrical energy at a desired frequency;
a processing unit; and
a memory storing instructions that, when executed by the processing unit, configure the wind turbine to:
determine, in an optimization procedure, a sequence of said operating modes for a future period of time, wherein determining the sequence comprises estimating, for the future period of time and for each of plural different sequences that include different combinations of operating modes, an optimization parameter from at least an estimated lifetime consumption and an estimated energy production associated with the operation in the operating modes of a respective sequence, wherein the estimation of the optimization parameter is further based on at least one estimated external parameter;
obtain a current value for the at least one external parameter;
determine an actual operating mode for the wind turbine for a current point in time, wherein the determining of the actual operating mode comprises
estimate an adjusted optimization parameter for each of the plural different sequences of operating modes that define an operating mode at the current point in time and for which the optimization parameter has been estimated in the optimization procedure,
wherein the adjusted optimization parameter is estimated for the respective sequence of operating modes by adjusting the optimization parameter, which has been estimated in the optimization procedure for the respective sequence, for the current value of the at least one external parameter, and
further comprises select one of the different operating modes as the determined actual operating mode based on the estimated adjusted optimization parameters, wherein the optimization procedure is not repeated for determining the actual operating mode; and
operate the wind turbine in the determined actual operating mode,
wherein the obtaining of the current value, the determining of the actual operating mode, and the operating of the wind turbine in the determined actual operating mode are performed repeatedly using the same optimization parameter estimated for the plural different sequences of operating modes in the optimization procedure.

15. A non-transitory computer-readable storage medium, the computer-readable storage medium including instructions that when executed by a processing unit that controls operation of a wind turbine which is operable in plural different operating modes that differ by at least one of lifetime consumption of the wind turbine and energy production by the wind turbine, cause the processing unit to:

determine, in an optimization procedure, a sequence of said operating modes for a future period of time, wherein determining the sequence comprises estimating, for the future period of time and for each of plural different sequences that include different combinations of operating modes, an optimization parameter from at least an estimated lifetime consumption and an estimated energy production associated with the operation in the operating modes of a respective sequence, wherein the estimation of the optimization parameter is further based on at least one estimated external parameter;

obtain a current value for the at least one external parameter;

determine an actual operating mode for the wind turbine for a current point in time, wherein the determining of the actual operating mode comprises estimate an adjusted optimization parameter for each of the plural different sequences of operating modes that define an operating mode at the current point in time and for which the optimization parameter has been estimated in the optimization procedure, wherein the adjusted optimization parameter is estimated for the respective sequence of operating modes by adjusting the optimization parameter, which has been estimated in the optimization procedure for the respective sequence, for the current value of the at least one external parameter, and further comprises select one of the different operating modes as the determined actual operating mode based on the estimated adjusted optimization parameters, wherein the optimization procedure is not repeated for determining the actual operating mode; and operate the wind turbine in the determined actual operating mode, wherein the obtaining of the current value, the determining of the actual operating mode, and the operating of the wind turbine in the determined actual operating mode are performed repeatedly using the same optimization parameter estimated for the plural different sequences of operating modes in the optimization procedure.

* * * * *